(12) United States Patent
Riggen et al.

(10) Patent No.: US 10,721,939 B2
(45) Date of Patent: Jul. 28, 2020

(54) PRESSURIZED SMOKER FOR COOKING

(71) Applicant: Kyle Riggen, Leander, TX (US)

(72) Inventors: Kyle Riggen, Leander, TX (US); Matt Kool, Austin, TX (US)

( * ) Notice: Subject to any disclaimer, the term of this patent is extended or adjusted under 35 U.S.C. 154(b) by 200 days.

(21) Appl. No.: 15/860,991

(22) Filed: Jan. 3, 2018

(65) Prior Publication Data

US 2019/0200628 A1 Jul. 4, 2019

(51) Int. Cl.
*A23B 4/052* (2006.01)
*A23L 5/10* (2016.01)

(52) U.S. Cl.
CPC .......... *A23B 4/0523* (2013.01); *A23B 4/052* (2013.01); *A23L 5/17* (2016.08); *A23V 2002/00* (2013.01)

(58) Field of Classification Search
CPC ........................................................ A23B 4/052
See application file for complete search history.

(56) References Cited

U.S. PATENT DOCUMENTS

| | | | |
|---|---|---|---|
| 2,168,491 A * | 8/1939 | Parmeter | B60N 3/16 126/19.5 |
| 2,906,191 A * | 9/1959 | Lee, Sr. | A47J 27/0802 99/342 |
| 2,970,589 A * | 2/1961 | Cushman | F01N 5/00 126/19.5 |
| 4,175,485 A * | 11/1979 | Wojahn | A23B 4/052 99/482 |
| 4,469,020 A * | 9/1984 | Hamilton | A47J 27/16 99/352 |
| 4,686,896 A * | 8/1987 | Gordon | A23B 4/052 426/314 |
| 5,368,872 A * | 11/1994 | Davis, Jr. | A23B 4/052 426/281 |
| 5,582,095 A * | 12/1996 | Rial | A47J 47/14 126/19.5 |
| 6,446,543 B1 * | 9/2002 | Lai | A23B 4/002 126/19.5 |
| 6,531,430 B1 * | 3/2003 | Lambert | C10M 169/042 123/1 A |
| 7,703,386 B1 * | 4/2010 | Bourgeois | A23B 4/0523 99/340 |
| 2005/0051038 A1 * | 3/2005 | Bartelick | F24C 15/327 99/482 |
| 2010/0310733 A1 * | 12/2010 | Hoffman | F24C 7/00 426/233 |
| 2011/0093410 A1 * | 4/2011 | Knuckman | A22C 21/0069 705/500 |

(Continued)

FOREIGN PATENT DOCUMENTS

| WO | WO-9103972 A1 * | 4/1991 | A23B 4/044 |
|---|---|---|---|
| WO | WO-2013111005 A1 * | 8/2013 | A23L 5/17 |

*Primary Examiner* — Jacob J Cigna
(74) *Attorney, Agent, or Firm* — Schwegman Lundberg & Woessner, P.A.

(57) ABSTRACT

Disclosed are methods and apparatus for smoking food such as meats, under pressure. In many examples, the source of pressure, and some heat, will be an internal combustion engine; with the exhaust from the engine communicated to a pressure chamber in which the meat or other food is placed. A separate heat source will be associated with the pressure chamber to provide increased temperatures within the pressure chamber. In some examples, the heat source can be a gas flame source, such as either propane or liquid natural gas.

22 Claims, 3 Drawing Sheets

(56) References Cited

U.S. PATENT DOCUMENTS

| | | | |
|---|---|---|---|
| 2011/0209473 A1* | 9/2011 | Fritz | F01K 23/065 60/605.2 |
| 2011/0247505 A1* | 10/2011 | Davis | A23B 4/052 99/472 |
| 2014/0030401 A1* | 1/2014 | Cusack | A47J 37/0763 426/314 |
| 2019/0200628 A1* | 7/2019 | Riggen | A23B 4/0523 |

* cited by examiner

PRESSURIZED SMOKER FOR COOKING

FIELD OF THE INVENTION

The present disclosure relates generally to methods and apparatus for smoking meat and other food products; and more specifically relates to methods and apparatus smoking such food products under pressure. In some embodiments, the pressure will be supplied by the exhaust from an internal combustion engine.

BACKGROUND OF THE INVENTION

Many devices are used for smoking meats and other food products. Generally, in such devices the meat will be subjected to heat, such as from a propane or natural gas burner, or from combustion source, most commonly a wood and/or charcoal fire. In many techniques, the heat will be supplemented with exposure of the meat (or other food) to smoke, either exclusively generated by the fire, or as supplemented with, for example, water-soaked woodchips of selected types to generate smoke, and to impart an associated flavoring to the food, during the cooking process.

A downside to conventional smokers and methods of their use is that it can take an extended time, up to several hours, to smoke the meat to a desired doneness. This long cooking time results from a combination of the typically low temperature required to smoke dense and/or relatively thicker cuts of meat so as to not overcook exterior portions while adequately cooking the interior portions.

Cooking of foods under pressure to accelerate the cooking process has been known in cooking foods using boiling liquid (for example, water) in a pressure cooker. In such cooking, as the liquid boils it raises the internal pressure. In a conventional pressure cooker, this raised pressure increases the boiling point of water or other liquid, and also forces the heated liquid into the food, accelerating cooking. However, such techniques have been limited to use of liquid-based cooking. Meats cooked in this process tend to be gray in color and not the appetizing brown color resulting from a traditional smoker.

In efforts to obtain some taste benefits of smoking meats with less time, techniques have been developed for partially cooking meat through two different processes in combination. For example, the meat may be initially cooked by a first technique, for example in a pressure cooker, or in an oven, typically generally elevated temperatures; and then moving the meats (or other food) to a grill or smoker to attempt to impart some of the flavors obtained with subjecting the need to a smoke-filled environment. Such techniques, while faster, have typically not provided the same taste or color as conventional slow smoking processes. Additionally, such processes are relatively cumbersome, requiring additional cooking equipment and transferring the food during the process. As a result, it would be desirable to have an apparatus capable of smoking meats under pressure, to accelerate the cooking, while maintaining the characteristics of the smoking process.

BRIEF DESCRIPTION OF THE DRAWINGS

FIG. 1B depicting the smoker from an end view without the closing plate in place; and FIG. 1C depicts a cross-sectional view vertical cross-sectional view of the pressurized smoker.

DETAILED DESCRIPTION OF THE INVENTION

The following description and the drawings sufficiently illustrate specific embodiments to enable those skilled in the art to practice them. Portions and features of some embodiments described herein may be included in, or substituted for, those of other embodiments.

The present description addresses methods and apparatus for smoking food such as meats, under pressure. In many examples, the source of pressure, and some heat, will be an internal combustion engine; wherein the exhaust from the engine is communicated to a pressure chamber in which the meat or other food is placed. A separate heat source will be operatively associated with the pressure chamber to provide controlled increased temperatures within the pressure chamber. In some examples, the heat source can be a gas flame source, such as either propane or liquid natural gas; while in other examples the heat source can be a solid fuel-burning source, such as wood or charcoal fuel. Where the heat source includes a flame, the flame will need to be external to the pressure chamber for the availability of combustion air. In other examples, the heat source can be an electrically resistive heating element. In some examples, the heat source could include a combination of electrical and flame-based heating mechanisms.

In examples in which one or more resistive heating elements are utilized, one or more of the resistive elements can be placed within the pressure chamber, as the heat can be generated in the absence of oxygen, or outside the pressure chamber. In other examples, such as where a gas flame or solid fuel flame forms the heat source, the flame will be located external to the pressure chamber. In some such embodiments, an outer chamber there may be configured to extend at least partially around the pressure chamber; and the flame source may be housed within the outer chamber. For example, the heat source may be located within a lower portion of the outer chamber, and adjacent a lower portion of the pressure chamber, such that heat generated from the heat source is directed to and around the pressure chamber.

In some examples, the heat source is configured to extend along a substantial part of the length of the pressure chamber. For purposes of the present description, the heat source extending for at least 75% of the length of the pressure chamber is considered a "substantial" part of the length of the pressure chamber. In other examples, the pressure chamber and the supply of pressurized gases may be cooperatively configured to provide some degree of convection within the pressure chamber as a pressure relief valve operates to allow escape of gases from the pressure chamber.

Figure 1A:
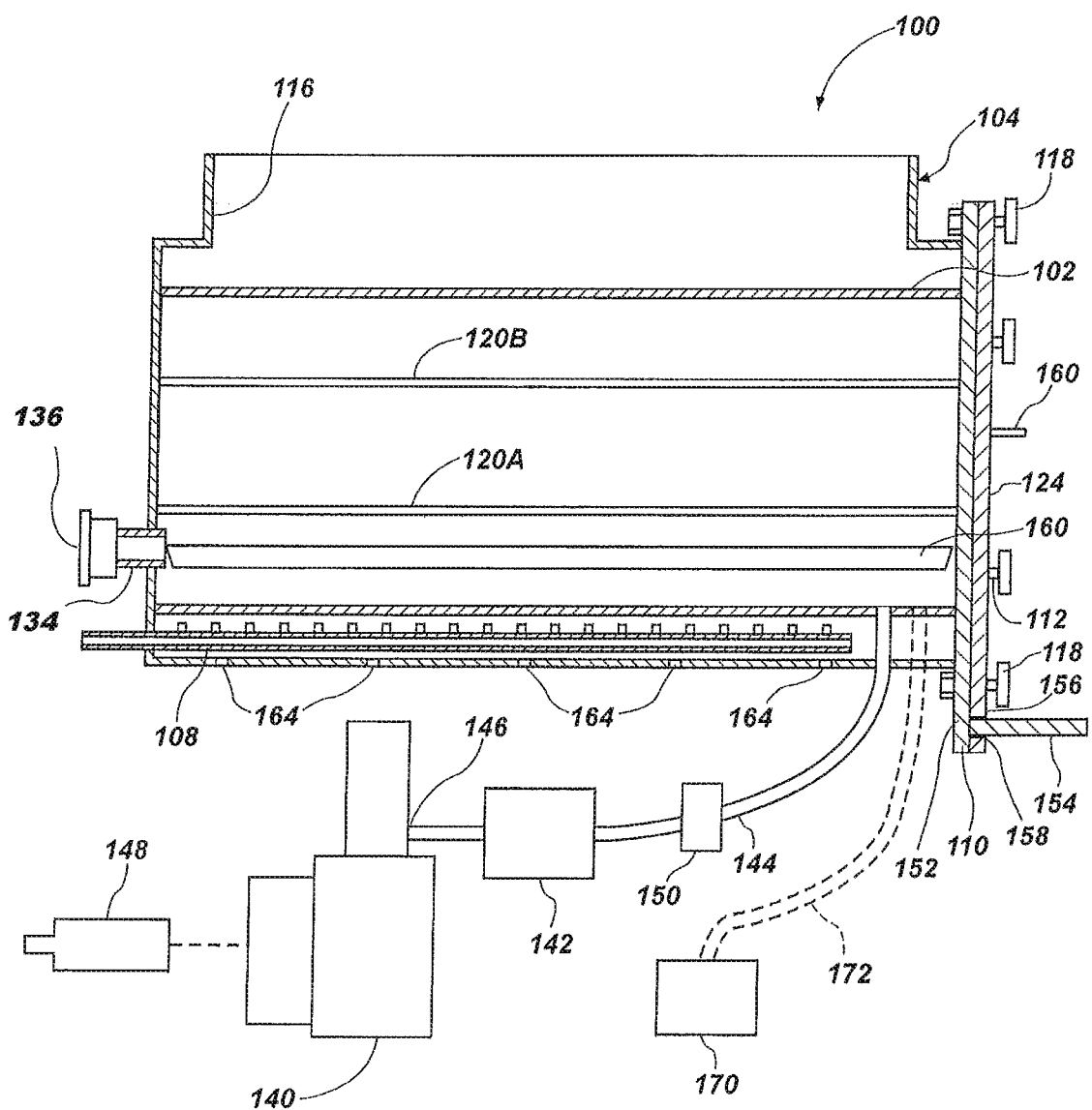
FIGS. 1A-1C schematically depict a cross-sectional view of an example pressurized smoker; with FIG. 1A depicting the pressurized smoker from a side view.
Figure 1B:
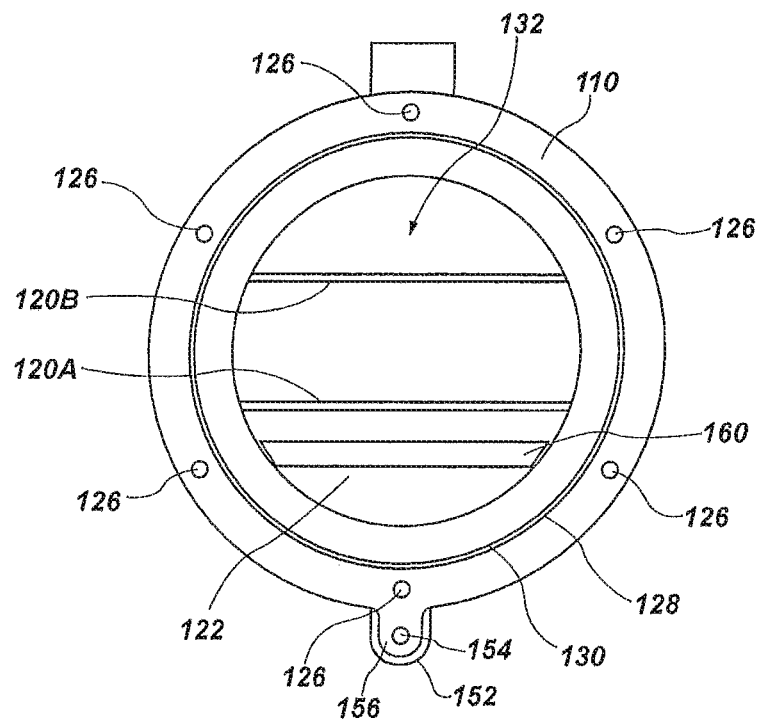
Figure 1C:
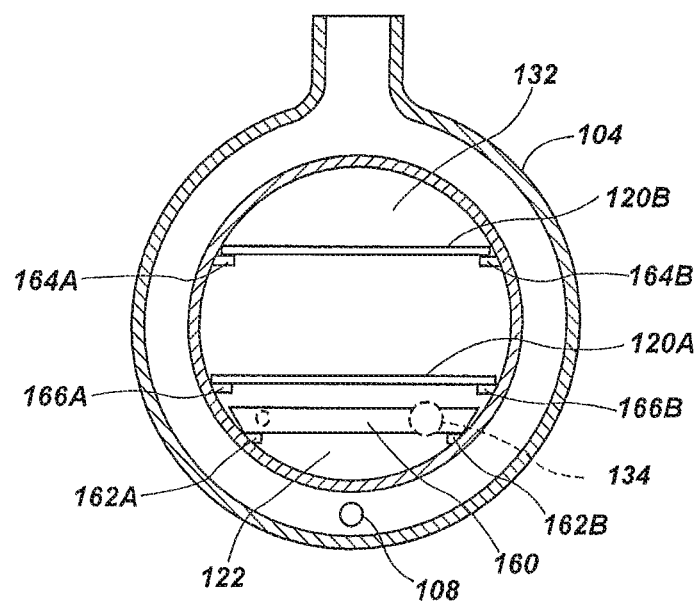

Referring now to FIGS. 1A-1C, the Figures depict a representative example of a pressurized smoker in accordance with the above description, with FIG. 1A depicting the pressurized smoker from a side view; FIG. 1B depicting the smoker from an end view without the closing plate in place; and FIG. 1C depicting a cross-sectional view vertical cross-sectional view of the pressurized smoker. Pressurized smoker 100 includes a pressure chamber 102, which in this example, is located entirely within an outer chamber 104. In the depicted example, outer chamber 104 supports a gas burner, indicated generally at 108, Because of the combustion gases resulting from gas burner 108, outer chamber 104 includes an exhaust opening indicated generally at 116 for escape of the combustion products from the gas burner 108 and perforated holes 164 in outer chamber 104 near the burner 108 for combustion air. In some examples, one or more of perforated holes 164 may be sized to facilitate insertion of a match or other flame device for lighting gas burner 108. In the depicted example, gas burner is a single tube, periodically perforated along its length, and extending along a substantial portion of the length of pressure chamber 102. Different configurations of burner may be used for different sizes are configurations of the pressure chamber and outer chamber. Generally, the burner should be capable of generating heat of sufficient BTU to result in temperatures within the pressure chamber within the range of 200° F. to 600° F., with a temperature within a range of 300° F. to 400° F. being suitable for many cooking applications.

In the depicted example, pressure chamber 102 is permanently affixed within outer chamber 104, such as by welding. The positioning of pressure chamber 102 in a fixed position within outer chamber 104 (and in the depicted example, having a common member closing the fixed end of each chamber) can be assisted with supports welded in place to support pressure chamber 102 in the desired position. Because pressure chamber 102 and outer chamber 104 are in a fixed position relative to one another, both chambers may be coupled to a common flange 110. Flange 110 serves as an endcap for outer chamber 104, and serves as a mounting plate for a closure plate 124 to seal pressure chamber 102. In the depicted example (and as can best be seen in FIG. 1B), flange 110 includes a circular recess 128, for supporting an o-ring 130 to facilitate sealing closure of pressure chamber 102 with a closure plate, indicated generally at 124.

Closure plate 124 can be a flat plate secured by multiple bolts, indicated typically at 126 extending through closure plate 124 and engaging threaded nuts 118. In some examples, the bolts will be secured to flange 110, such as by welding, so as to simplify removal and placement of threaded nuts 118 on the bolts 126. In some examples, threaded nuts 118 will be configured with either wings or multiple arms or other features, so as to be easily gripped by hand for either removing or installing closure plate 124 in position on flange 110 to seal pressure chamber 102.

Other closing mechanisms can be used to establish a pressure-tight seal between closure plate 124 and flange 110 (or another mounting fixture). For example, various forms of clamps or other closure mechanisms other than threaded couplings will be apparent to persons skilled in the art having the benefit of this disclosure. Such other clamps are closure mechanisms can include, for example, various forms of lever or cam operated latches or locking mechanisms. In some examples, closure plate 124 may be secured in movable relation to either pressure chamber 102 or outer chamber 104, such as through a hinge placed to allow pivoting of closure plate 124 away from the opening to pressure chamber 102.

In embodiments such as that depicted, wherein closure plate 124 is removable from the remainder of pressurized smoker 100, additional supporting structures may be provided to assist in supporting closure plate 124 when not engaged with flange 110. In the depicted embodiment, the supporting structure Includes a rod 154 extending from flange 110, and extending through an aperture 158 in closure plate 124. Aperture 158 is spaced outside of O-ring 130, so as to not affect the sealing of pressure chamber 102.

As can be seen from the end view of FIG. 1B, multiple cooking racks 120A, 120B may be placed within pressure chamber 102 to support meat or other foods to be smoked. Cooking racks 120A, 120B will preferably rest on runners (166A-B, 164A-B, respectively in FIG. 1C) or other supports within pressure chamber 102 so as to be readily removed from pressure chamber 102 by sliding along the supports, to facilitate placing or removing food on the racks. In some examples, a drip tray 160 will extend beneath the lowest cooking rack 120A to catch grease from the food above. Drip tray 160 can similarly extend on runners or other supports (168A-B in FIG. 1C).

In many examples, during cooking the lower portion 122 of the cooking chamber 132 within pressure chamber 102, will include wood chips or other materials to generate the smoke for flavor can be located. In some examples, the wood chips will be held within a metal pan within the lower portion 122 of the cooking chamber; while in other examples, wood chips can just be placed on the bottom of the pressure chamber 102 directly above the heat source.

In some embodiments, smoke can be optionally be introduced by other methods, such as smoke generated by an external smoke generator 170 connected to the pressure chamber 102 by a conduit 172. Pressure chamber 102 may be constructed, for example, of steel pipe (which in some examples could be stainless steel pipe) having a 10 gauge wall thickness (0.1088 inch). In the depicted example, pressure chamber 102 is generally cylindrical, and has a 10.75 inch outer diameter; while outer chamber 104 has a 12.75 inch outer diameter. Although in the depicted example, pressure chamber 102 and outer chamber 104 have a generally circular configuration, either or both structures may be of a different shape. For example, pressure chamber 102 can have a vertical cross-section which is square, rectangular, oval, etc. In some examples, sheet steel may be bent and welded into a desired configuration. Other configurations may be substantially smaller or larger, for example with a pressure chamber having a diameter or comparable dimension of 2 feet or greater. In larger dimensioned chambers, instead of stationary racks being utilized for supporting food, other movable platforms might be utilized. For example, such a larger chamber may include a rotisserie, including a "ferris wheel"-like array of racks, which, in some examples, will extend generally the length of the chamber, and which may be supported and rotated as desired.

Other materials can also be used to construct pressure chamber 102 so long as the material and the dimensions are sufficient to hold pressure within the intended operating pressure and temperature range, with a suitable safety margin. For example, operating pressures within the range of 1 to 20 psi may be used for most applications, with pressures within the range of 5 to 15 psi being adequate for many applications.

Pressurized smoker 100 also includes a source of pressurized air. Because the actual smoke used for cooking will primarily be generated within the pressure chamber, various supplies of pressurized air may be utilized. These could include, for example, a tank of pressurized gas, for example atmospheric air or an inert gas (such as, for example, nitrogen) regulated to a pressure as discussed herein; or alternatively an air compressor capable of supplying atmospheric air or an inert gas at a pressure as described herein. In other examples, the source of pressurized gas may be an internal combustion engine 140 which provides exhaust which is used to pressurize pressure chamber 102 during cooking operations. In various examples, internal combustion engine 140 can be a propane-powered engine, or in other examples can be an injured configured to burn organic plant or animal based-fuel such as, for example simple vegetable oils. In some examples, the internal combustion engine will be associated with an electrical generator, as a generator is typically configured with an automatic governor suitable to keep the RPM in a specified range, which is useful for maintaining a continuous pressure within the pressure chamber 102. In the absence of an engine not including such an automatic governor, and another device to control the throttle to maintain pressure within a controlled range. Engine speed can also be controlled by manual throttles or governors.

In examples as identified, wherein the engine 140 is configured to burn animal or plant-based fuels, the engine may be, for example, a diesel engine configured to burn biodiesel fuel. Many conventional biodiesel fuels are formed from vegetable oils, animal fats, or in some cases, recycled restaurant grease. Conventional biodiesel fuel, straight vegetable oils or animal fats, etc. are typically mixed with methanol, often with a catalyst, to produce a "crude biodiesel" which is then refined into the biodiesel fuel. Some such conventional biodiesel fuels may be less than optimal for use for the present application. However, in some cases, straight vegetable oil may be used as fuel for a biodiesel-type engine, which may be desirable for use in the described smoker. For many applications, burning of straight vegetable oil can lead to carbon buildup in the engine and reduced engine life. However, for the present application, such limitations on engine life may be of limited concern so long as the engine is used only for periodically cooking food products. When such natural vegetable oils are utilized, oils such as olive oil, peanut oil, corn-based cooking oil, avocado oil, etc. may be utilized.

The horsepower of the engine used for the pressurized smoker is of relatively limited concern; instead, the concern is that the engine be capable running reliably with approximately 1 to 20 psi backpressure on the exhaust (as determined consistent with the anticipated operating conditions). In examples in which a propane-powered generator is used, the Sportsman GEN 11000LP 11000W 2.8 Hp. portable generator, manufactured by Buffalo Corp. of O'Fallon Missouri has been found satisfactory. In other examples, a 7 Hp. propane powered generator has been used. In such examples, the Sportsman GEN4000DF portable generator is an example of a satisfactory unit.

In addition to the fuel used for the generator, other liquids which may affect the content of the exhaust used to pressurize the smoker can include the lubricants used for the internal combustion engine. As a result, in many applications it will again be desirable to use an animal or plant-based lubricant, such as straight vegetable oil as lubricants for the engine, which may be of the same types proposed above for use as straight vegetable oil fuel.

A pressure relief valve 136 in communication with pressure chamber 102 through a conduit 134 will be used to regulate pressure within pressure chamber 102 to a desired level. As noted previously, the pressure will typically be between 5 and 20 psi, with from 7 psi to 15 psi being suitable for many applications.

Depending upon the system utilized, including the fuel and lubricants, it may be desirable to include a purification mechanism, such as a catalytic converter, as indicated in 142. In such examples, the exhaust line 146 from the engine can be communicated to the catalytic converter 142, before being conveyed through a further exhaust conduit 144 to pressure chamber 102.

Universal catalytic converters normally offered as replacement converters for automobiles, are obtainable and can be used to create a chemical reaction in which undesirable gases in the exhaust are "converted" (such as, for example, nitrogen oxides, and carbon monoxide) into separate components gases; and in some case to oxidize unburned hydrocarbons in the exhaust to produce carbon dioxide and water. Universal catalytic converters, originally designed for automotive use, may be used. In other examples, it may be desirable to include a particle filter to remove insoluble particulate matter from the exhaust gases.

In some examples, various forms of sound deadening of the internal combustion engine (of whatever form), as described herein. Such sound deadening can include cushioned pads or other materials placed between the internal combustion engine and a supporting structure (such as, for example, the cart assembly 202 discussed in reference to FIG. 2). As will be apparent to persons skilled in the art having the benefit of this disclosure, various forms of rubber (synthetic or natural) or other resilient materials can be used to dampen vibrations that would otherwise be transmitted from the vibrating engine. In other examples, an optional intake muffler, indicated generally at 148, can be provided at the intake to the internal combustion engine 140. In other examples, an optional exhaust muffler 150 can be inserted in exhaust conduit 144 extending from optional catalytic converter 142 (if present) or otherwise in exhaust line 146 extending from the internal combustion engine.

Figure 2:
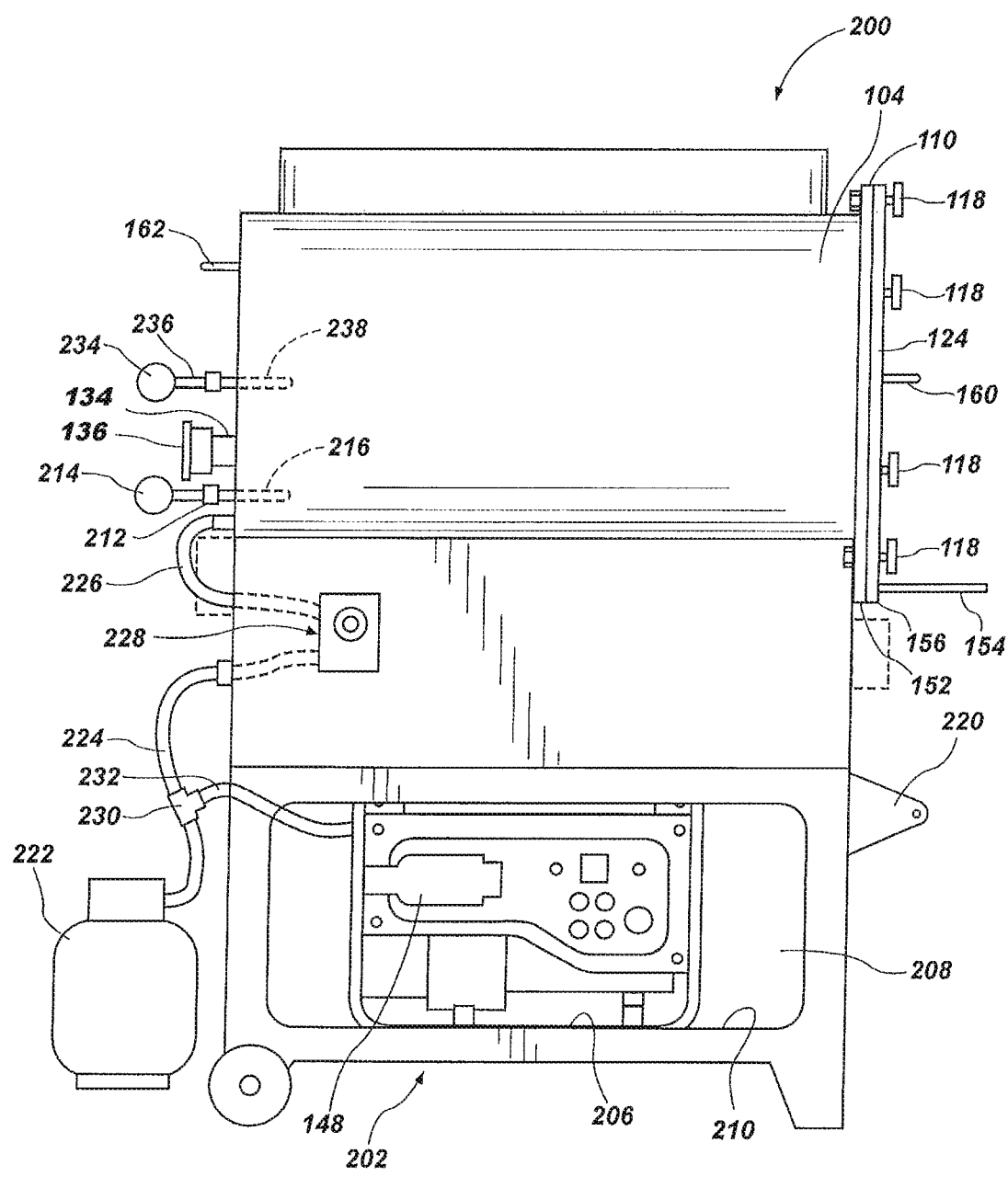
FIG. 2 depicts a side view of an example pressurized smoker in accordance with the views of FIGS. 1A-1C.

Referring now to FIG. 2 of the drawings, therein is depicted an example configuration for a pressurized smoker 200 as described relative to FIGS. 1A-1C depicted from a side, external view. Components corresponding identically to components as discussed relative to FIGS. 1A-1C are numbered in FIG. 2 the same as in such prior figures. Pressurized smoker 200 includes a cart assembly, indicated generally at 202, which in the example embodiment is wheeled on one end (or both ends), as indicated generally at 204, to facilitate easy movement. A lower shelf 206 supports a propane-powered generator 208, and an opening 210 provides access to controls of the generator 208. Cart assembly 202 supports outer chamber 104 configured in the same manner as outer chamber 104 of FIG. 1A.

In the depicted example, a pressure gauge 214, including a probe, indicated in phantom at 216, extends into pressure chamber 102. In many examples, the pressure gauge will be supported on a solid support member indicated generally at 212, to place the gauge readout in a readily viewable location and position. In the depicted example, a temperature gauge 234, including a probe, indicated in phantom at 238, extends into pressure chamber 102. Like pressure gauge 214, temperature gauge 234 can be supported on a solid support member 236 to place the gauge readout in a readily viewable location hand position. In some examples, pressure gauge 214 and temperature gauge 234 will be placed at generally a similar horizontal location in pressure chamber 102.

As noted above, pressure relief valve 136 serves to relieve pressure in excess of a desired set operating pressure for the pressure chamber. In the depicted example, a control valve assembly 228 serves to regulate the fuel flow to the burner within the outer chamber to regulate the temperature within the pressure chamber (as described relative to burner 108 of FIG. 1). In the depicted example, the fuel will be propane, stored in a separate propane tank 222 and coupled to an input of the control valve assembly 228 through a conduit 224 which may be removably coupled to the pressurized smoker assembly 200 through a releasable fitting. A conduit 226 from the controlled side of the control valve assembly 228, which in many examples will include an integrated pilot light and igniter, will extend to the burner (108 in FIG. 1A, not depicted in FIG. 2).

Cart assembly 202 includes a handle, such as a bar handle 220 on the side opposite the wheels, to facilitate movement of pressurized smoker 200. Handles may also be provided on one end of outer chamber 104 and on closure plate 124, as indicated at 162 and 160, respectively. In some examples, drip trays may be attached to the cart assembly 202, as indicated in phantom at 240 and 242. Such drip trays can be placed, for example, beneath the pressure chamber opening (240), and/or under the pressure relief valve 136 (as indicated at 242).

During the cooking process, a pressurized smoker such as described relative to any of the referenced figures will be utilized to smoke food products by enclosing the food products into pressure chamber (by placing the racks containing the food into the pressure chamber) and bolting the closure plate 124 on flange 110 to establish a pressure tight seal of pressure chamber 102. Pressurized gases will be pumped into the pressure chamber to establish a desired pressure level in the pressure chamber; and a heat source operatively associated with the pressure chamber to increased temperatures within the pressure chamber will be activated. Such activation may include lighting a gas flame for a propane or liquid natural gas heat source; supplying electrical current to a resistive heating element; or lighting a wood or charcoal fueled fire, for example.

As described above, the supplying of pressurized gases may be achieved by coupling the exhaust of an internal combustion engine to supply exhaust gases to the pressure chamber, commonly within a range of 1 psi to 20 psi, and most commonly with a range of 7 psi to 15 psi. In other examples, a different source of pressurized air may be utilized to establish the desired pressure levels within the pressure chamber.

To better illustrate the methods and apparatuses described herein, a non-limiting set of example embodiments are set forth below as numerically identified examples.

Example 1 is a pressurized smoker, comprising: a pressure chamber configured to enclose food to be cooked; a source of pressurized gases in fluid communication with the pressure chamber; and a heat source secured in association with the pressure chamber to increase temperatures within the pressure chamber.

In Example 2, the subject matter of Example 1 wherein the source of pressurized gases includes an internal combustion engine.

In Example 3, the subject matter of Example 2 wherein the pressurized gases from the exhaust of the internal combustion engine are communicated to the pressure chamber through a conduit.

In Example 4, the subject matter of Example 3 optionally includes a pressure regulator valve operatively coupled to the pressure chamber to maintain pressure within the pressure chamber at between approximately 1 and 20 psi.

In Example 5, the subject matter of Example 4 optionally includes a pressure regulator valve to maintains pressure within the pressure chamber between approximately 7 and 15 psi.

In Example 6, the subject matter of any one or more of Examples 3-5 wherein the pressurized gases from the exhaust of the internal combustion engine are at a temperature between 100° F. to 600° F.

In Example 7, the subject matter of any one or more of Examples 2-6 wherein the internal combustion engine burns propane for fuel.

In Example 8, the subject matter of any one or more of Examples 2-7 wherein the internal combustion engine burns a plant-based organic fuel.

In Example 9, the subject matter of any one or more of Examples 2-8 wherein the internal combustion engine is portion of an electrical generator.

In Example 10, the subject matter of any one or more of Examples 7-9 wherein the internal combustion engine is lubricated with plant-based organic lubricants.

In Example 11, the subject matter of any one or more of Examples 1-10 wherein the heat source comprises a gas flame source.

In Example 12, the subject matter of Example 11 wherein the gas flame source is a propane burner.

In Example 13, the subject matter of any one or more of Examples 1-12 optionally include an outer chamber, wherein the outer chamber extends around at least a portion of the pressure chamber.

In Example 14, the subject matter of Example 13 wherein the heat source is located within the outer chamber and exterior to the pressure chamber.

In Example 15, the subject matter of any one or more of Examples 1-14 wherein the heat source is located at least in part within the pressure chamber.

In Example 16, the subject matter of any one or more of Examples 1-15 wherein the heat source comprises a solid fuel-burning source.

In Example 17, the subject matter of Example 16 wherein the solid fuel-burning source comprises a wood or charcoal-burning heat source.

Example 18 is a method of smoking food products, comprising: enclosing the food products in a pressure chamber; supplying pressurized gases to the enclosed pressure chamber; and activating a heat source extending at least partially beneath the pressure chamber to increase temperatures within the pressure chamber.

In Example 19, the subject matter of Example 18 wherein supplying pressurized gases to the enclosed pressure chamber comprises: establishing fluid communication between an exhaust port of an internal combustion engine and the pressure chamber; and operating the internal combustion engine to generate exhaust gases to pressurize the pressure chamber.

In Example 20, the subject matter of any one or more of Examples 18-19 optionally include regulating the pressure within the pressure chamber to between 1 and 20 psi.

In Example 21, the subject matter of Example 20 optionally includes further comprising regulating the pressure within the pressure chamber to between 7 and 15 psi.

In Example 22, the subject matter of any one or more of Examples 18-21 wherein the pressurized gases from the exhaust of the internal combustion engine are at a temperature between 100° F. to 600° F.

In Example 23, the subject matter of any one or more of Examples 18-22 wherein the heat source comprises a gas-fueled burner.

In Example 24, the subject matter of any one or more of Examples 18-23 wherein the internal combustion engine burns fuel comprising organic plant-based oil.

In Example 25, the subject matter of Example 24 wherein the internal combustion engine is lubricated with organic plant-based oil.

In example 26, the pressurized smoker of any of examples 1-17 is used to perform a method in accordance with any one or more of examples 18-25.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. In addition, in the above Detailed Description, various features have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A pressurized smoker, comprising:
   a pressure chamber configured to enclose food to be cooked;
   a source of pressurized gases in fluid communication with the pressure chamber; and
   a heat source secured in association with the pressure chamber to increase temperatures within the pressure chamber;
   wherein the source of pressurized gases includes an internal combustion engine; and
   wherein the pressurized gases from an exhaust of the internal combustion engine are communicated to the pressure chamber through a conduit.

2. The pressurized smoker of claim 1, wherein the pressurized gases from the exhaust of the internal combustion engine are at a temperature between 100° F. to 600° F.

3. The pressurized smoker of claim 1, wherein the internal combustion engine burns a plant-based organic fuel.

4. The pressurized smoker of claim 1, wherein the internal combustion engine is a portion of an electrical generator.

5. The pressurized smoker of claim 1, wherein the heat source is located at least in part within the pressure chamber.

6. The pressurized smoker of claim 1, further comprising a pressure regulator valve operatively coupled to the pressure chamber to maintain pressure within the pressure chamber at between approximately 1 and 20 psi.

7. The pressurized smoker of claim 6, wherein the pressure regulator valve maintains pressure within the pressure chamber at between approximately 7 and 15 psi.

8. The pressurized smoker of claim 1, wherein the internal combustion engine burns propane for fuel.

9. The pressurized smoker of claim 8, wherein the internal combustion engine is lubricated with plant-based organic lubricants.

10. The pressurized smoker of claim 1, wherein the heat source comprises a gas flame source.

11. The pressurized smoker of claim 10, wherein the gas flame source is a propane burner.

12. The pressurized smoker of claim 1, further comprising an outer chamber, wherein the outer chamber extends around at least a portion of the pressure chamber.

13. The pressurized smoker of claim 12, wherein the heat source is located within the outer chamber and exterior to the pressure chamber.

14. The pressurized smoker of claim 1, wherein the heat source comprises a solid fuel-burning source.

15. The pressurized smoker of claim 14, wherein the solid fuel-burning source comprises a wood or charcoal-burning heat source.

16. A method of smoking food products, comprising:
   enclosing the food products in a pressure chamber;
   supplying pressurized gases to the enclosed pressure chamber; and
   activating a heat source operatively extending at least partially beneath the pressure chamber to increase temperatures within the pressure chamber;
   wherein supplying pressurized gases to the enclosed pressure chamber comprises operating an internal combustion engine to generate exhaust gases, and communicating the exhaust gases to the pressure chamber to pressurize the pressure chamber.

17. The method of claim 16, wherein the pressurized gases from the exhaust of the internal combustion engine are at a temperature between 100° F. to 600° F.

18. The method of claim 16, wherein the heat source comprises a gas-fueled burner.

19. The method of claim 16, further comprising regulating the pressure within the pressure chamber to between 1 and 20 psi.

20. The method of claim 19, further comprising regulating the pressure within the pressure chamber to between 7 and 15 psi.

21. The method of claim 16, wherein the internal combustion engine burns fuel comprising organic plant-based oil.

22. The method of claim 21, wherein the internal combustion engine is lubricated with organic plant-based oil.

* * * * *